(12) United States Patent
Seitz et al.

(10) Patent No.: US 7,972,670 B2
(45) Date of Patent: Jul. 5, 2011

(54) STRUCTURED PAPER RELEASE LINER, ADHESIVE-BACKED ARTICLE ASSEMBLY AND METHOD OF MAKING SAME

(75) Inventors: David S. Seitz, Woodbury, MN (US); Kanta Kumar, Maplewood, MN (US); Larry A. Meixner, Woodbury, MN (US); Mieczyslaw H. Mazurek, Roseville, MN (US); Stefan O. Dietrich, Ratingen (DE)

(73) Assignee: 3M Innovative Properties Company, St. Paul, MN (US)

( * ) Notice: Subject to any disclaimer, the term of this patent is extended or adjusted under 35 U.S.C. 154(b) by 960 days.

(21) Appl. No.: 10/595,835

(22) PCT Filed: Nov. 19, 2004

(86) PCT No.: PCT/US2004/038976
§ 371 (c)(1),
(2), (4) Date: Mar. 8, 2007

(87) PCT Pub. No.: WO2005/052082
PCT Pub. Date: Jun. 9, 2005

(65) Prior Publication Data
US 2007/0166501 A1    Jul. 19, 2007

(51) Int. Cl.
*B32B 33/00*   (2006.01)
*B32B 5/02*    (2006.01)
*B32B 3/00*    (2006.01)

(52) U.S. Cl. ........ 428/40.1; 428/41.8; 428/98; 428/141; 428/142; 428/152; 428/153; 428/156; 428/161; 428/165; 428/174

(58) Field of Classification Search ................. 428/40.1, 428/41.8, 98, 141, 142, 152, 153, 156, 161–163, 428/165, 167, 171, 174, 179–183
See application file for complete search history.

(56) References Cited

U.S. PATENT DOCUMENTS

| 4,435,461 | A | * | 3/1984 | Gray et al. .................... 428/141 |
| 5,141,790 | A | | 8/1992 | Calhoun et al. |
| 5,650,215 | A | | 7/1997 | Mazurek et al. |
| 6,197,397 | B1 | | 3/2001 | Sher et al. |
| 6,524,675 | B1 | | 2/2003 | Mikami et al. |
| 6,630,218 | B1 | | 10/2003 | Abe |

FOREIGN PATENT DOCUMENTS

| JP | 7-300232 | 11/1995 |
| JP | 9-141812 | 6/1997 |
| JP | 11-323790 | 11/1999 |
| WO | WO 93/03107 | 2/1993 |
| WO | WO 95/11945 | 5/1995 |
| WO | WO 00/69985 | 11/2000 |
| WO | WO 02/074877 A2 | 9/2002 |
| WO | WO 03/060031 A1 | 7/2003 |

* cited by examiner

*Primary Examiner* — Patricia L Nordmeyer

(57) ABSTRACT

A structured paper release liner (10) for use with an article (44) backed with a pressure sensitive adhesive, an adhesive-backed article assembly (42) and methods of making each are disclosed. The liner (10) comprises a piece of paper (14) having a release side free of a structural support layer, a back side, and a structured release surface (48) having a pattern formed into the paper (14) on the release side. A release material is on the structured release surface of the paper. The pattern formed in the paper (14) is designed so as to form fluid egress channels in a bonding surface of the pressure sensitive adhesive (46). The fluid egress channels define a structured bonding surface (48) having exit pathways for fluid to bleed out from behind the article when the structured bonding surface (48) is adhered to or otherwise disposed on a substrate.

20 Claims, 2 Drawing Sheets

STRUCTURED PAPER RELEASE LINER, ADHESIVE-BACKED ARTICLE ASSEMBLY AND METHOD OF MAKING SAME

FIELD OF THE INVENTION

The present invention relates to release liners for use in forming a pattern in a pressure sensitive adhesive surface of an adhesive-backed article, in particular, a paper release liner having a pattern on its release side that is suitable for forming an air-bleedable pattern in a pressure sensitive adhesive surface of an adhesive-backed film, more particularly, a paper release liner having a pattern formed in its release side that is suitable for forming an air-bleedable microstructured pattern in a pressure sensitive adhesive surface of an adhesive-backed film without the pattern being formed in a structural support layer on the release side of the liner, and even more particularly, to such a paper release liner that is suitable for forming an air-bleedable microstructured pattern in a hot melt type pressure sensitive adhesive surface of an adhesive-backed film. The present invention is also related to assemblies of such release liners and adhesive-backed articles, and methods of making such release liners and assemblies.

BACKGROUND

Structured release liners have been used to impart air-bleedable patterns in the adhesive surface of pressure sensitive adhesive-backed films. Such release liners have included those made with a plastic (e.g., a polyester) film core having a layer of a thermoplastic polymeric material (e.g., polyethylene) laminated to at least the release side of the liner. Because of cost considerations, it has also been popular for such release liners to be made with a paper core having a structural support layer of a thermoplastic polymeric material (e.g., polyethylene) forming at least the release side of the liner. More often, the paper core is sandwiched between two layers of thermoplastic polymeric material with one layer forming the release side and the other layer forming the back side of the liner. A release material (e.g., a silicone) is typically coated on the surface of the release side. A pattern is formed in the plastic structural support layer on the release side of the liner. This pattern is suitable for forming the air-bleedable pattern in the pressure sensitive surface of the adhesive-backed film. The pattern is either formed solely in the corresponding plastic layer or, if the plastic layer is relatively thin compared to the depth of the pattern, into both the plastic layer and the core paper. For example, see Japanese Kokai Patent Applications Nos. HEI 11-323790 and HEI 9-141812, and U.S. Pat. No. 6,630,218. In either case, the plastic material structurally supports the pattern formed in the release liner. Such patterns have been formed in the plastic structural support layer by heating the thermoplastic material until it softens sufficiently to allow the desired pattern to be embossed or otherwise formed into its surface. Such release liners are often referred to as polycoated paper release liners or simply as paper release liners. It is clear that references in the prior art to paper release liners, used to impart air-bleedable patterns in pressure sensitive adhesive surfaces, are referring to such polycoated paper release liners.

The present invention is an improvement over such prior release liners, assemblies made with such release liners and the methods for making each.

SUMMARY OF THE INVENTION

The present invention provides a structured paper release liner for use with an article backed with a pressure sensitive adhesive or PSA. The present invention preferably provides such a release liner that is suitable for use with a hot melt type PSA-backed article, but can also be used with a solvent- or water-borne PSA where the solvent or water is typically driven off with heat. The PSA preferably exhibits pressure sensitive adhesive properties at room temperature. One such adhesive-backed article can be a PSA-backed compliant film or other sheet material such as, for example, that used to replace or decorate (e.g., pin striping, detailing, advertising, etc.) conventional paint on the body of a vehicle (e.g., an automobile, aircraft, watercraft), equipment, appliances, architecture or any other substrate.

The structural support layer on the release side of prior art polycoated paper release liners is usually a thermoplastic polymer that softens when heated so that it can be embossed with a pattern that can be used to impart an air bleedable pattern to the bonding surface of a pressure sensitive adhesive. The thermoplastic nature of such patterned structural support layers, however, can result in one or more of several limitations in its use. For example, any time the structured release liner is heated, it can result in a loss of pattern structure formed in the thermoplastic structural support layer. This is especially true, when the pattern structure is a microstructure. Some pressure sensitive adhesives that could be cast or coated directly onto a structured polycoated release liner need to be processed (e.g., coated, cured or dried) at high temperatures. For example, hot melt type PSAs (e.g., low viscosity acrylic PSAs) need to be heated to relatively high temperatures (e.g., about 120° C.) to lower their viscosity enough to enable the PSA to fill and replicate the pattern structure on the release liner. Additionally, it is preferable to process hot melt PSAs at even higher temperatures (e.g. around 200° C.) to lower the melt viscosity even further and allow faster processing of the PSA. These temperatures can easily be above the temperature at which the thermoplastic structural support layer begins to soften (e.g., a polyethylene layer will begin to soften at about 95° C.). If the thermoplastic layer on the polycoated release liner softens during such high temperature processing, all or part of the pattern structure formed in the structural support layer can be degraded or lost. Other high temperature processing that could, at least potentially, have such a detrimental affect on the pattern structure in the polycoated release liner include circumstances where one or more additional layers or coatings (e.g., one or more top coats) are applied to the non-structured surface of adhesive that will be bonded to an article. Another circumstance could be where one or more layers or coatings are applied directly to the article after the article and PSA are bonded or otherwise processed together. Such layers or coatings could require relatively high curing or other processing temperatures.

In addition, patterned structural support layers made of thermoplastics like polyethylene can become tacky or sticky when heated. Especially with polycoated paper liners having a polycoat on both sides, the backside of the liner can become tacky and adhere to the equipment used to move the liner along during processing (e.g., contact rollers of web-handling equipment). Such a tacky backside of the liner may also adhere to the top surface of the article when, for example, the adhesive-backed article assembly is wound into a roll while the liner's backside is still tacky. Another potential example is when a solvent-borne PSA is used and the structural support layer, like a polyethylene coating, can absorb solvents from the PSA being used. In cases where such PSAs must be cured and/or dried at relatively high temperatures, the absorbed solvent appear to cause blistering and formation of bubbles in the polycoated paper release liner as the adhesive is cured/dried. Another potential advantage of the present inventive structured paper release liner relates to role stability (e.g., telescoping). Polycoated release liners can be difficult to handle because their surfaces can have a relatively low coefficient of friction. The surfaces of the present structured paper release liner will typically exhibit relatively lower friction coefficients, making them less likely to telescope or otherwise be unstable. In addition, during converting operations (e.g., kiss-cutting), polycoated paper release liners can be more susceptible to the structural support layer(s) and the paper core splitting or separating apart. The structural support layers of prior art polycoated release liners can also be harder to print on than the present structured paper release liner. Furthermore, the present structured paper release liner can be easier to recycle, because it is mostly paper.

In one aspect of the present invention, such a paper release liner is provided that comprises a piece of paper and a release material. The piece of paper, typically in sheet, strip or roll form, has a release side without a structural support layer, a back side, and a structured release surface having a pattern that is embossed or otherwise formed into the paper on the release side, and not in a structural support layer. With the present invention, the pattern is not formed either solely in a structural support layer or into both a structural support layer and a paper core. As used herein, a structural support layer is defined as a continuous plastic layer or coating that is capable of having a structured pattern plastically formed therein, where the pattern is either completely contained within the layer of plastic or the plastic layer is thin enough that the pattern is at least partially formed in the paper core as well as the layer of plastic, and the layer of plastic could be separated from, or produced separately from, the paper core in one piece. Examples of release liners that include such a structural support layer can be found in Japanese Kokai Patent Applications Nos. HEI 11-323790 and HEI 9-141812, and U.S. Pat. No. 6,630,218. The structured release surface can be a microstructured release surface with a microstructured pattern formed into the release side of the paper. Such microstructured patterns can be those that have individual features with at least one dimension of less than 500 micrometers. Examples of such microstructured release surfaces and patterns can be those found, for example, in PCT Publications Nos. WO 00/69985 and WO 95/11945, and U.S. Pat. No. 5,141,790, which are incorporated herein by reference in their entirety. The release material is substantially adhered to, permanently adhered to or otherwise bonded to the structured release surface of the paper, and preferably on all, or substantially all, of the structured release surface that will come in contact with the pressure sensitive adhesive. That is, there is a sufficient amount of release material to provide acceptable release forces between the release liner and the adhesive-backed article. The pattern formed in the paper is designed and dimensioned, or otherwise operatively adapted, so as to form fluid egress channels in a bonding surface of the pressure sensitive adhesive (i.e., a surface of the PSA used to adhere the adhesive-backed article to a substrate). As used herein, the term fluid egress channels refers to channels that provide egress for air, water or other fluids. The pattern can be formed in the pressure sensitive adhesive by casting, coating or otherwise applying the PSA onto the structured release surface such that the adhesive conforms to the pattern in the paper. The pattern in the PSA can also be formed by the pattern in the paper liner being embedded in or otherwise forced to penetrate into the PSA such that the adhesive conforms to the pattern in the paper. The fluid egress channels define a structured bonding surface having exit pathways for at least some or all of the fluid to bleed out from behind the article when the article is adhered to a substrate, and preferably when the article is adhered to a smooth surface on the substrate.

The pattern formed in the paper can be designed (e.g., dimensioned) or otherwise operatively adapted so as to form such fluid egress channels that (1) define a volume of at least $1 \times 10^3$ $\mu m^3$ per every 500 $\mu m$ diameter circular area on the structured bonding surface of the pressure sensitive adhesive, and/or (2) will be substantially undetectable on an upper or exposed surface of the article (i.e., the surface of the article opposite the structured bonding surface), after final application of the article onto a substrate and, preferably, even when the article is an adhesive-backed compliant film. That is, the channels are sufficiently undetectable on the upper surface so that the appearance of the exposed surface of the applied article will not be substantially affected adversely by the channels. The final application of the article onto a substrate typically involves the application of a required level of pressure in order to obtain a required level of adhesion with the substrate. This usually results in a high degree of wet out by the adhesive on the substrate.

The pattern formed in the release side of the paper liner can provide a plurality of outwardly extending protrusions (e.g, ridges) that extend outwardly from the surface of release side so as to penetrate and form the fluid egress channels, and other possible structures, in the structured bonding surface of the PSA. The pattern formed in the paper liner can also be designed so as to provide a plurality inwardly extending cavities or other depressions that form protrusions in the PSA that, thereby, define the fluid egress channels, and other possible structures, in the structured bonding surface of the adhesive. The pattern formed in the paper liner can also comprise a plurality of outwardly extending protrusions and/or inwardly extending depressions that are sized and shaped (e.g, square pyramidal shaped, square flat plateaus, etc.) so as to form fluid egress channels in the pressure sensitive adhesive, for example, when the PSA is cast, coated or otherwise applied onto the structured release surface and/or when the release surface is forced to penetrate into the PSA, with the adhesive conforming to the pattern in the paper.

The paper liner can be made with a conventional clay-coated paper, may be made with a paper coated with another inorganic material, and may also be made with a glassine paper, calendared kraft paper or any other suitable paper. While the release surface of the paper liner is not formed with a structural support layer (i.e., a plastic layer or coating), the paper liner may include some plastic components. For example, it may be desirable for the formula used to make the paper to include one or more of plastic particles and/or fibers, and polymeric bonding agents. The paper can also further comprise a structural support layer or some other support material on the back side of the paper. Alternatively, the release liner does not include a structural support layer or some other support material on the back side of the paper. The back side of the paper is usually relatively flat, but not necessarily for all applications. It can be desirable for the surface of the release side and/or the back side of the paper liner to be moisture vapor transmissive. In this way, moisture vapor may escape the paper relatively uniformly when the paper is being processed at high temperatures (e.g., about 100° C.).

The release material can be any suitable release material and can include silicone release materials such as, for example, ultraviolet (UV) or heat curable silicone release material. Because prior polycoated paper release liners are sensitive to high temperatures, silicone release materials applied to such release liners can only be coated and cured at relatively low temperatures. As a result, the silicone release layer is typically either not cured completely or the curing processes is extended (i.e., the process is slowed). Not curing the release material completely increases the likelihood of the release material transferring to and contaminating the PSA. Slowing the curing process reduces efficiency and increases costs. The relative insensitivity to high temperatures exhibited by the present inventive paper release liner allows for more types of release materials to be used, to be more completely cured and/or to be processed a faster rates.

In another aspect of the present invention the present release liner is provided in combination with an article backed with a solvent or water based PSA or hot melt type PSA so as toy form an adhesive-backed article assembly. The pattern formed in the paper is embedded, penetrated or otherwise in the adhesive so as to form a structured bonding surface on the adhesive, with fluid egress channels that define exit pathways, which preferably provide a continuous fluid egress to a periphery of the article, for fluid to bleed out from behind the article when the structured bonding surface is adhered to or otherwise disposed on a substrate, and preferably when the article is adhered to a smooth surface on the substrate. The fluid egress channels can define a volume of at least $1\times10^3$ $\mu m^3$ per every 500 µm diameter circular area of the structured bonding surface of the adhesive. The article can be a compliant film having an upper or exposed surface, and the fluid egress channels configured by the pattern of the paper so as to be substantially undetectable on the upper or exposed surface of the film, after final application of the film onto a substrate. The compliant film can have a thickness that is usually in a range from about 300 µm or less, and preferably about 25 µm to about 100 µm for some compliant decorative films. The adhesive-backed article can be sealable as indicated by an initial percent wet out test result of at least about 80%, at least about 85% and at least 95% performed immediately after, soon after or up to about an hour after the adhesive-backed article is applied.

In an additional aspect of the present invention, a method is provided for making a structured paper release liner, like that described above, which can be used with an article backed with a pressure sensitive adhesive. The method comprises:

providing a piece of paper, typically in sheet, strip or roll form, having a release side free of a structurally supportive layer and a back side:

embossing or otherwise forming a pattern in the paper on the release side, and not in a structural support layer, so as to produce a structured release surface on the release side, the pattern formed in the paper being designed or otherwise operatively adapted so as to form fluid egress channels in a bonding surface of the pressure sensitive adhesive (e.g., when the pressure sensitive adhesive is cast, coated or otherwise applied onto the structured release surface or when the pattern is embedded in or otherwise penetrates into the adhesive), such that the fluid egress channels define a structured bonding surface having exit pathways for fluid to bleed out from behind the article when the article is adhered to a substrate, and preferably when the article is adhered to a smooth surface on the substrate; and coating, laminating or otherwise depositing, applying or otherwise providing a release material so as to substantially, and preferably permanently, adhere or otherwise bond to the release side of the paper, either before or after forming of the structured release surface of the paper, and preferably on all, or substantially all, of the release side forming the structured release surface that will come in contact with the pressure sensitive adhesive. The pattern is preferably formed in the pressure sensitive adhesive by casting, coating or otherwise applying the PSA onto the structured release surface such that the adhesive conforms to the pattern in the paper. The pattern in the PSA may be formed by the pattern in the paper liner being embedded in or otherwise forced to penetrate into the PSA such that the adhesive conforms to the pattern in the paper.

In this method, the forming can occur without imparting a substantial portion of the pattern through to the back side of the paper (i.e., while maintaining the back side of the paper substantially flat and/or smooth). Factors such as the thickness and density of the paper release liner, as well as the type of backing used to support the release liner during the pattern forming operation, can determine whether a portion of the pattern forms through to the back side of the liner. For example, if the pattern is formed by processing the release liner through a metal embossing nip roller and a metal backing roller, the pattern is less likely to form through to the back side of the liner. If a rubber backing nip roller is used, it is more likely that part of the pattern will form through to the back side of the liner. The release liner can also further comprise a structural support layer or some other support material on the back side of the paper. The release liner can also not include a structural support layer or some other support material on the back side of the paper.

In a further aspect of the present invention, a method is provided for making an adhesive-backed article assembly. The method comprises providing a structured paper release liner like that described above and providing a pressure sensitive adhesive. The method can also comprise bringing together the PSA and the structured release surface of the paper release liner (e.g., by casting, coating or otherwise applying the pressure sensitive adhesive onto the structured release surface and/or forcing the structured release surface into the PSA) so as to form fluid egress channels in the pressure sensitive adhesive. The method can additionally comprise laminating or otherwise bonding together the pressure sensitive adhesive and the back of an article to form an adhesive-backed article. The method can further comprise forming the adhesive-backed article assembly by either performing the bonding together and then the bringing together (i.e., make the adhesive-backed article and then form the fluid egress channels in the PSA) or performing the bringing together and then the bonding together. The fluid egress channels define a structured bonding surface of the adhesive-backed article having exit pathways, which preferably provide a continuous fluid egress to a periphery of the article, for fluid (e.g., air) to bleed out from behind the article when the structured bonding surface is adhered to or otherwise disposed on a substrate, and preferably when the article is adhered to a smooth surface on the substrate.

This method can furthermore comprise curing the pressure sensitive adhesive after the bringing together step. The curing can also occur after the forming of the adhesive-backed article assembly. The pressure sensitive adhesive can be a hot melt type PSA and during the method, the paper can be heated to a temperature that could cause a polycoated paper release liner to substantially warp, significantly distort the pattern in its structural support layer, decompose or otherwise become unsuitable or difficult to use in the method. During the method, the paper can be heated to such a high temperature, e.g., by external heat sources, by the use of a heated PSA, etc. Such temperature limits can be, for example, temperatures of about 100° C. to 110° C. or above.

BRIEF DESCRIPTION OF THE DRAWINGS

FIG. 2b is a representative cross sectional view of the embossing surface of FIG. 2a;

FIG. 4b is a representative cross sectional view of the embossing surface of FIG. 4a.

DETAILED DESCRIPTION

In one embodiment of the present invention, a microstructured paper release liner is provided for use with an article backed with a solvent- or water-borne pressure sensitive adhesive (PSA) or a hot melt type PSA. One such adhesive-backed article can be a PSA-backed compliant film or other sheet material such as, for example, a decorative film like that used to replace conventional paint on the body of a vehicle (e.g., an automobile, aircraft, watercraft), equipment, appliances, architecture or any other substrate.

Figure 1:
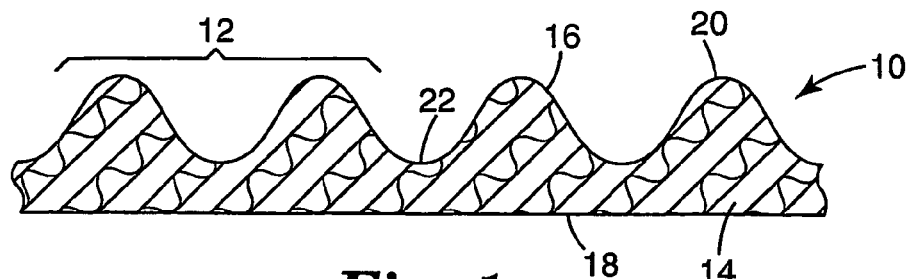
FIG. 1 is a cross sectional view of a structured paper release liner according to one embodiment of the present invention.

Referring to FIG. 1, the present inventive paper release liner 10 is not a conventional polycoated paper release liner. The liner 10 has a pattern 12 formed in the paper 14 itself and not in any structural support layer. The liner 10 has a release side 16, which is free of any structural support layer, and a back side 18. The release side 16 is coated with a conventional release material (e.g., a silicone release material) using, for example, conventional application techniques. The pattern 12 typically includes a peak or high feature 20 and a valley or low feature 22. The structural support layer can be defined herein as any of the structurally supportive layers of resin material that have been coated or laminated onto paper and used to form any of the prior art structured release liners such as, for example, those found in International Publication No. WO 00/69985 A1 (i.e., U.S. Pat. No. 6,524,675), U.S. Pat. No. 5,650,215, and the Japanese Patent Application No. Hei 7-300232 (Unexamined Publication No. Hei 9-141812), filed Nov. 17, 1995 (Published Jun. 3, 1997), entitled Embossing Release Paper And Its Manufacturing Method. Such structural support layers are continuous thermoplastic or thermosetting polymeric layers that are embossable.

The present inventive paper release liner may optionally have a structural support layer or any other suitable support material on its back side that provides at least a degree of dimensional, structural and/or thermal stability to the paper. It can be desirable for the back side of the present inventive release liner to be relatively flat. It can also be preferable for the back side of the present liner to be relatively flat such as, for example, when the back side of the liner comes in contact with the top side of the adhesive-backed article and, in particular, the top side of adhesive-backed decorative films. The back side of the liner can come into contact with the top side of the article, when the resulting assembly is wound into a roll or when a plurality of such assemblies are stacked one on top of the other.

The pattern is formed into the paper by compressing and/or bending the fibrous paper material without substantially breaking, cutting, severing or otherwise damaging the fibrous paper material. The fibrous paper material is substantially damaged when the pattern and/or the paper loses so much structural integrity that the liner is unable to form or maintain fluid egress channels in the structured pressure sensitive adhesive (PSA) that define functional exit pathways (i.e., exit pathways that allow fluid to bleed out from behind the article when the article is adhered to a substrate surface, and preferably to a smooth substrate surface) or if the paper cannot be removed easily from the PSA. The paper desirably maintains sufficient structural integrity so that it can be removed from the PSA in one piece instead of breaking apart into small pieces when the user tries to remove it.

The present inventive release liner is used to produce a desired microstructured pattern on the bonding surface of an adhesive, typically a pressure sensitive adhesive that may be a hot melt PSA, a solvent-borne PSA, an emulsion PSA or the like. The desired structured features can be imparted by casting or otherwise coating the adhesive onto the structured release surface of the present release liner, which was previously embossed, or otherwise formed, with the desired structured features. The adhesive may also be coated onto a substrate, and laminating the liner onto it to form the features in the adhesive.

Papers that are suitable in the practice of the present invention are papers that have sufficient thickness to be embossed and substantially maintain the embossed pattern. Suitable papers include those that maintain the desired embossed pattern without a structural support layer. Such papers can include commercially available glassine papers, super-calendared Kraft papers, machine glazed papers (also referred to as machine finished papers), latex saturated papers, extensible kraft papers, kraft papers, clay filled papers, and clay coated papers. In general, glassine papers and super calendared Kraft papers are papers that have had their density increased (i.e., calendared), typically, by compression. These two types of paper typically differ in the sizing agent content, surface smoothness, and degree of calendaring. Clay coated papers include a clay coating on one or both sides of the paper, and can include clay as a filler. Glassine, machine glazed, and super calendered Kraft papers may also be clay coated. A commonly used clay is kaolin, and the clay coating may include other materials such as titanium dioxide, calcium carbonate, aluminum oxide, silicon dioxide, polymeric particles and the like. Additionally, the term clay coated papers may refer to papers having inorganic coatings such as aluminum oxide or silicon dioxide without the presence of an actual clay.

Examples of commercially available clay coated papers that have been embossed according to the present invention include Rhinelander 83# CC RLSE CG80 available either from Rhinelander or Wausau, 4P Rube clay coated paper and GF 120 available from Huhtamaki, R1000 65# CC1S SiC1S available from Enterprise, 50# bleached Lumisil office LS050 available from Stora Enso. Examples of super-calendared Kraft papers that have been embossed according to the present invention include SC SILOX papers available from Akrosil, and 65# BL C2S available from Loparex. Examples of glassine papers that have been embossed according to the present invention include Silox BL90GL and BR 90 GGLSIL available from Akrosil, and the HV series of papers from Huhtamaki. An example of a latex saturated paper that has been embossed is 60# NT LST available from Loparex. Examples of extensile kraft papers that have been embossed include 1-74 BEK (32-2) 1200 and 60# BL PST available from Loparex. An example of a Kraft paper that has been embossed is 55# Bleached Kraft 11001167714 available from Loparex. Examples of machine finished papers that have been embossed include 100#M RLSE AB22/blue available from Wausau Mosinee, and M-liner 23406 and M-liner 23/24581 available from Schleipen & Erkens.

The commercially available papers range in thickness from about 75 microns to about 155 microns and range in basis weight from about 80 to about 140 grams per square meter. The paper should be sufficiently thick to be embossed, to maintain the embossed pattern, and have sufficient mechanical properties to survive processing (e.g., during embossing, during adhesive coating, etc.) and be still be useable, but be thin enough to wind into a roll as needed. Mechanical properties may include tensile strength (e.g., typically about 8 kN/m in the machine direction and about 2.5 kN/m in the cross direction) and/or Elmendorf tear strength (typically about 700 mN in the machine direction and about 900 mN in the cross direction).

The paper may be treated on the clay coated side prior to coating the release material or on the backside to obtain various properties. For example, the backside may be treated with surfactants and/or humectants to help the paper lay flat during processing. The backside may also be coated on the backside with organic or inorganic materials to enhance the dimensional stability of the paper.

For some applications, clay coated papers are desired for making a structured paper release liner according to the present invention, especially a microstructured paper release liner. In general, the clay (e.g., kaolin, titanium dioxide, calcium carbonate, and the like) coats the fiber surface of the paper with platelets, filling voids between the fibers and giving the paper a smoother surface. Such smooth surfaces are desirable for embossing. The clay coating can also provide a barrier to keep the release coating on the surface of the paper where it is needed. Finally, clay coated papers tend to hold a deeper emboss because there is room for compression of the fibers. Glassine and super calendered kraft papers may work well with a shallower emboss.

Embossing the Paper Liner

The inventive paper release liner has the structured pattern in the paper itself. The pattern may or may not be microstructured. Patterns that can be used in the process are generally described in the art in patents such as, for example, PCT Publications Nos. WO 00/69985 and WO 95/11945, and U.S. Pat. No. 6,197,397 (Sher et al), U.S. Pat. No. 5,141,790 (Calhoun et al.), U.S. Pat. No. 6,524,675 (Mikami et al.) and U.S. Pat. No. 5,650,215 (Mazurek et al.). Examples of suitable patterns for a tool's embossing surface are square based pyramids (for example, see FIGS. 2a and 2b) and triangular based pyramids with sharp and blunt tips, as well as arrays of linear intersecting (cross-hatched) or non-intersecting ridges, linear patterns with a curved geometry (e.g., a linear sinusoidal pattern), and linear v-grooves (for example, see FIGS. 4a and 4b). The resulting pattern imparted to the paper liner are pyramidal dents (for example, see FIG. 3), arrays of intersecting ridges (for example, see FIG. 5), linear curved geometric ridges, and raised parallel ridges, respectively. Other suitable patterns may include lenticular shapes, hemispheres, ellipses, gumdrops, pillows, honeycombs, square grids, random patterns, or other arrays.

The paper can be embossed by mechanical means using a tool such as embossing nip rollers (e.g., an embossing roll backed by a backing roll), an embossed platen in a hydraulic press, and the like. Pressure is needed to compress the fibres, and the embossing tool can be heated to enhance the receptivity of the paper to embossing. Generally, heating the embossing tool will cause localized heating of the paper in the areas of contact, i.e., the surface of the paper, to produce a better emboss and to minimize the damage to the release coating during embossing. Paper fibers generally can contain hemicellulose and lignin and within a certain moisture range (0-15%), these materials can soften at elevated temperatures below 120° C. and behave like a thermoplastic material. This thermoplastic behavior of the fibers allows them to compress and bend instead of break. Clay coated papers may emboss well at lower pressures while densified papers may require higher pressures to achieve the same depth of emboss.

Figure 2A:
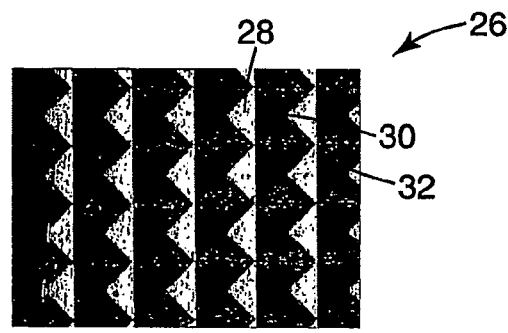
FIG. 2a is a photograph of an exemplary embossing surface of a tool for embossing a square-based pyramidal pattern into the release surface of a paper release liner in accordance with the principles of the present invention.
Figure 2B:
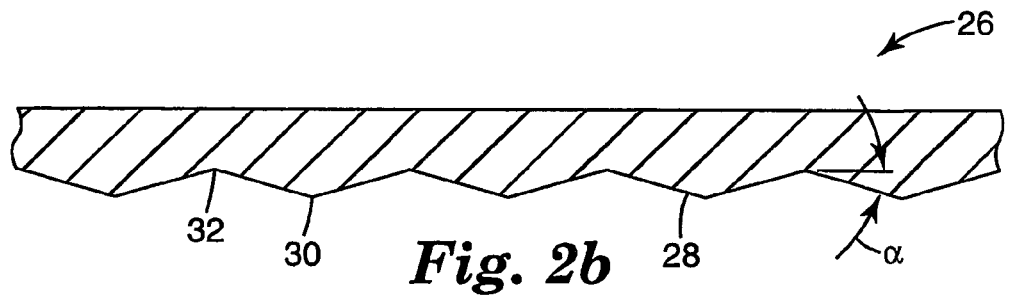
Figure 4A:
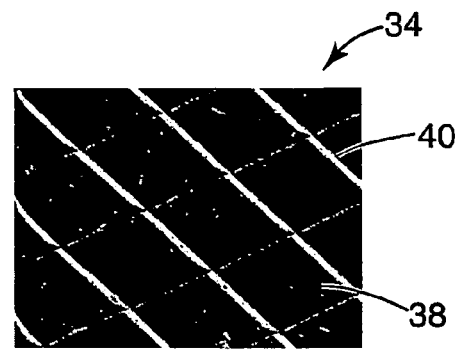
FIG. 4a is a photograph of another exemplary embossing surface of a tool for embossing a cross-hatched pattern into the release surface of a paper release liner in accordance with the principles of the present invention.
Figure 4B:
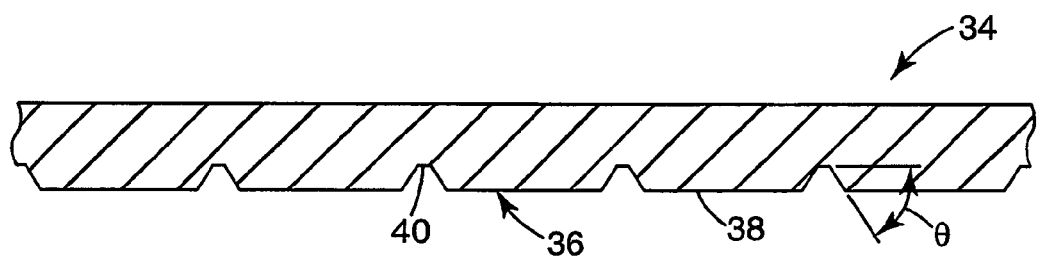

Referring to FIGS. 2a and 2b, an exemplary tool 26 can have a pattern on its face 28 of contiguous square-based pyramids defining peaks 30 and valleys 32, preferably, with a shallow angle α of up to about 45 degrees. Referring to FIGS. 4a and 4b, another exemplary tool 34 can have a pattern on its face 36 of an array of intersecting linear v-grooves defining plateaus 38 and channels 40, preferably, having side walls sloped at an angle θ of up to about 60 degrees.

Figure 3:
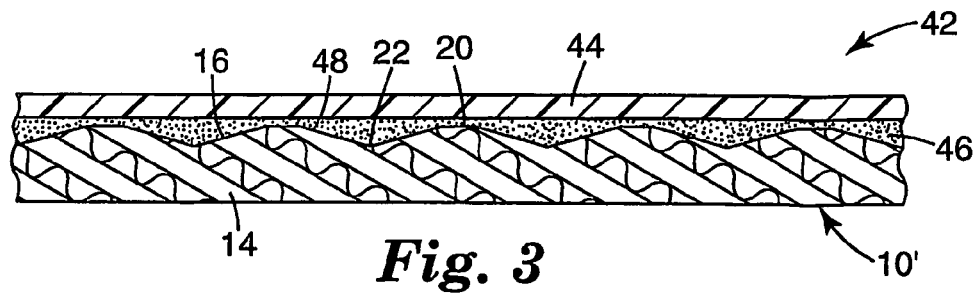
FIG. 3 is a cross sectional view of an adhesive-backed article assembly according to an embodiment of the present invention with a structured paper release liner having a pattern in its release side formed with the embossing tool surface of FIG. 2b.

Referring to FIG. 3, an exemplary adhesive-backed article assembly 42 comprises a release liner 10' having a release side that has been embossed using the tool 26 of FIG. 2b. The assembly 42 includes an article 44, such as a film, backed with a layer 46 of PSA, with the PSA layer 46 being sandwiched between the liner 10' and the article 44. The pattern formed in the paper 14 is in the adhesive layer 46 so as to form a structured bonding surface 48 on the adhesive 46 that will provide continuous fluid egress channels to a periphery of the article 44. The egress channels define exit pathways for fluid to bleed out from behind the article 44 when the structured release liner 10' is removed and the structured bonding surface 48 is adhered to or otherwise disposed on the surface of a substrate.

Figure 5:
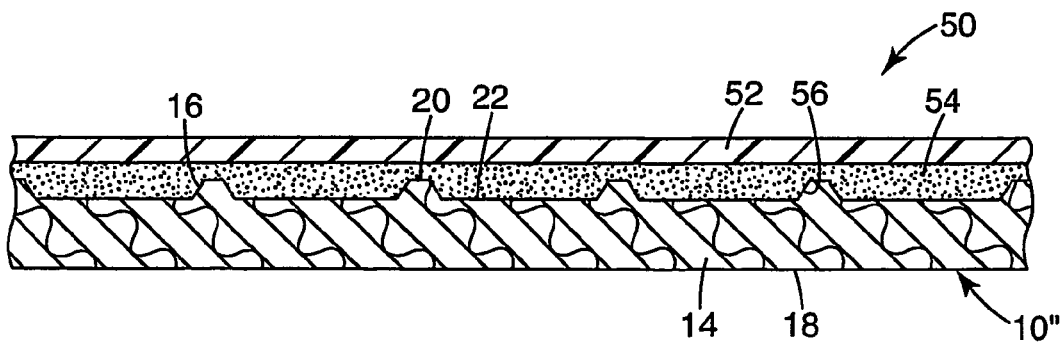
FIG. 5 is a cross sectional view of an adhesive-backed article assembly according to an embodiment of the present invention with a structured paper release liner having a pattern in its release side formed with the embossing tool surface of FIG. 4b.

Referring to FIG. 5, another exemplary adhesive-backed article assembly 50 comprises a release liner 10" having a release side that has been embossed using the tool 34 of FIG. 4b. The assembly 50 includes an article 52, such as a film, backed with a layer 54 of PSA, with the PSA layer 54 being sandwiched between the liner 10" and the article 52. The pattern formed in the paper 14 is in the adhesive layer 54 so as to form a structured bonding surface 56 on the adhesive 54 that will provide continuous fluid egress channels to a periphery of the article 52. The egress channels define exit pathways for fluid to bleed out from behind the article 52 when the structured release liner 10" is removed and the structured bonding surface 56 is adhered to or otherwise disposed on the surface of a substrate.

With structured paper liners according to the present invention, there is generally a loss of definition from the pattern on the original embossing tool to the pattern embossed in the paper and, therefore, the pattern of the structured bonding surface of the PSA layer. When the liner is embossed, the features created in the liner may lose some of the definition of the tool. When the adhesive is coated onto the liner, the adhesive may also loses some of the definition of the liner. So, while the structured bonding surface of the PSA layer will look similar to the tool, it will not be an identical structure and likely not as identical as the structure that can be formed in the structural support layer of a conventional polycoated paper liner. This difference can be seen in FIGS. 3 and 5. In FIG. 3, the valleys 22 in the paper liner 10' closely match the peaks 30 of the tool 26, but the peaks 20 of the paper liner 10' are not as high and sharp as the valleys 32 of the tool 26 are deep and sharp. Similarly, in FIG. 5, the valleys 22 in the paper liner 10"

closely match the plateaus 38 of the tool 34, but the peaks 20 of the paper liner 10" are not as high and sharp as the channels 40 of the tool 34 are deep and sharp. The tool is typically designed to account for the differences in the features that will occur during processing between the tool and the final PSA structure. For example, an embossing tool may have features 50% higher than the desired height of the adhesive feature, as the paper and indirectly the adhesive may only replicate 50% of the height of the tool.

The amount of embossing pattern that will be imparted to a paper can depend upon different processing parameters such as the type of paper, the pattern design, the embossing pressure, the embossing temperature, the temperature and humidity of the paper, the type of embossing roll or tool, the hardness of the embossing roll, the hardness of the backup roll, etc. The processing parameters can be changed to achieve the desired pattern in a paper under the optimum processing conditions. For example, a humidified paper may be embossed at lower pressures. The humidified paper can then be dried (e.g., by using heated embossing rollers), if necessary, to lower the moisture content of the paper and better retain the embossed pattern. A hard back-up roll, e.g., a steel roll, can produce a structured paper release liner with a smoother backside than a softer back-up roller, e.g., a rubber roller. In some cases, e.g., when the paper is relatively thin, using a soft backup roll can result in some protrusions on the backside caused by the high points or peaks in the embossing tool pushing the paper into the soft backup surface. If such a release liner is used with a film article having a high gloss top surface, a smooth backside may be desirable, especially if the resulting film article assembly is intended to be wound up into a roll. If the release liner is used with a film article having a textured or matte top surface, the surface texture of the liner's backside may not be particularly important.

Paper is a fibrous generally non-flowing material that is preferably only compressed or bent into a desired shape. The processing parameters for embossing a paper with a less than optimum pattern can be optimized. For example, embossing with a tool with sharp tips is easier than embossing with a tool having the same pattern except with blunt tips. For example, a sharp tipped tool can produce a distinctive pattern with relatively low embossing pressures, but such a tool can cut the fibers, resulting in weakened mechanical properties of the paper. In extreme cases, the paper may not have sufficient tensile strength for processing or use (e.g., for easy removal of the liner from the PSA by the end user). Adding shorter fibers or more fillers, e.g., clay, can enhance the embossing process. Such additions should be monitored to avoid adverse effects on the mechanical properties, e.g., tearing strength, stiffness, bursting strength, tensile strength, dimensional stability, smoothness etc.

Generally the paper has a pattern formed in only its release side. It may be desirable, however, for the same or a different pattern to be formed in both sided of the paper, depending on the desired final application. For example, such a double-patterned release liner could be desirable for use with an article having an adhesive on both sides (e.g., a double sided adhesive transfer tape).

The paper of the invention can be made by several processes. A release coated paper, e.g., a glassine paper or a clay coated paper having a silicone release coating on it, can be embossed with the desired pattern. Alternatively, a paper can be embossed and a release coating can be applied to the embossed paper, e.g., by spray coating a silicone material and curing. Another method is to simultaneously emboss and silicone coat a paper in one step, e.g., emboss the paper with an embossing tool bearing the release material.

While the inventive release liner may offer economic advantages of being less costly, it also offers other advantages. The paper is more stable at higher temperatures so the silicone release coating can be cured at higher temperatures or for longer times to allow a more complete cure of the silicone and reduce the amount of silicone transfer to the PSA. The higher temperature stability also enables the liner to by used with hot melt adhesives. Polyethylene coated papers can split, i.e., the polyethylene delaminates from the paper, during converting operations, such as during electrocut kiss cutting, and the inventive liner overcomes this deficiency in the art. Further, the backside of the liner can be easier to print.

Release Coating

The paper of the invention can be coated with a suitable release material. Generally, suitable materials are selected to release from the PSA that is used, and those skilled in the art are capable of selecting the proper release material for the PSA. Some release coatings are releasable only from certain classes of PSAs while some are more universal and either are suitable. Suitable release materials can include silicones, fluorosilicones, urethanes and fluoropolymers. Silicones are desirable for their availability and examples are thermal cured such as those cured with platinum, tin, rhodium, or radiation cured (e.g., e-beam, UV, etc.), and may be solvent based or solvent-free materials. The release coating may be applied on one or both sides of the paper, and may be the same release material or a different release material. Differential release liners can provide a tighter release on the side with embossed structure than on the back side so that when the liner is adhesive coated and wound into a roll, the adhesive will remain on the embossed side to protect the structures while the adhesive is laminated to a substrate.

Adhesive Coating

The paper release liner is suitable for use with a PSA. PSAs are generally known and any suitable PSA may be used with the appropriate release coating. The adhesive can be solvent based or an emulsion that is coated onto the embossed side of the release liner. The solvent or water is dried off, for example, in an oven and the adhesive may be cross-linked. The adhesive can also be a hot melt PSA that is hot melt coated onto the embossed side of the release liner and then cooled. It may also be crosslinked. The PSA may be coated onto a substrate and the liner is laminated onto the PSA to serve as a protective liner as well as an embossing tool. The adhesive coating may be continuous with the adhesive features protruding from plane of a continuous layer of adhesive, or the adhesive may be coated discontinuously so that the adhesive features form discrete islands that are separated from each other. The adhesive is selected to bond to the surfaces as is generally known in the art.

The rheology of the adhesive may be controlled as needed. If it is desirable to retain the features, and the channels between them, after the adhesive coated product has been applied to a substrate, as higher modulus PSA or more highly cross-linked adhesive may be used. If it is desirable for the adhesive features to flow together and close the channels between them, a softer or lower modulus adhesive may be used.

Articles

Articles that can be utilized in the present invention can include some structured protective films and compliant films like those generally made of various plastic materials used conventionally by those skilled in the art. Suitable films can include, for example, vinyl, polyvinyl chloride, plasticized polyvinyl chloride, polyurethane, polyethylene, polypropylene, fluororesin or the like. The thickness of the film can vary widely according to a desired application. For compliant films, the thickness is usually within a range from about 300 µm or less, and preferably about 25 µm to about 100 µm. Specific example of suitable compliant films can be found in U.S. Pat. No. 6,524,675(B1). For structured protective films, the thickness can be up to about 340-440 μm.

Application of the Adhesive-Backed Article to a Substrate

Articles that can be used with the present invention can be applied to a variety of surfaces and substrates. Such surfaces can include those that are relatively rough surfaces, smooth air-tight surfaces, uneven surfaces and flat surfaces. It is important to match a specific pressure sensitive adhesive to a substrate in order to achieve the desired level of adhesion. Examples of suitable substrates can include glass, metal, plastic, wood, and ceramic substrates, and painted or otherwise coated surfaces of these substrates. Representative plastic substrates can include polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers. The substrates can be generally smooth surfaced substrates that accentuate the need for an article with fluid egress. Substrates with rough surfaces typically provide an inherent egress for fluids trapped at an interface of an applied article because the rough surface permits fluid flow.

In the application of the adhesive-backed article, the article is typically positioned over the substrate. The microstructured adhesive surface can be such as to enable the movement of the adhesive-backed article about the surface of the substrate until pressure is applied to enable adhesive contact and wet out of the adhesive on the surface of the substrate. The appropriate level of pressure and resulting wet out will create a bond between the adhesive and the substrate.

Upon forceful application of the adhesive-backed article, the channels can permit air to bleed out around the periphery of the article, thereby eliminating air bubbles being trapped between the article and the substrate. Additionally, the microstructured features of the PSA can be such as to at least partially collapse during application of the adhesive-backed article, which can increase the amount of adhesive in contact with the substrate. The at least partial disappearance of channels in the PSA's bonding surface can be indicated through the wet out test described herein. The present invention is not necessarily limited to any particular wet out test results, but wet out test results of at least 80% are usually desired. The at least partial disappearance of the channels can indicate that the article has a desirable level of adhesion to the substrate.

The microstructured adhesive surface of an adhesive-backed compliant film, according to a preferred embodiment of the present invention, is formed with a microstructured pattern that is substantially undetectable from the surface of the film and therefore improves the overall appearance of the article. One method for measuring the appearance of such an article involves the use of the surface roughness test procedure, as described in U.S. Pat. No. 6,524,675(B1), which is incorporated herein by reference in its entirety, and reproduced below. In particular, upon adhesively applying the compliant film onto a smooth substrate, the upper surface of the compliant film appears to have no periodicity or repetitive pattern. Additionally, the surface roughness of the applied film appears to be no greater than the roughness of the bare film itself.

EXAMPLES

Test Methods

LSCM to Measure Height of Ridges/Structural Elements in the Liner

Microscopic examination of the embossed paper release liners was conducted using a Laser Scanning Confocal Microscope from Carl Zeiss Jena, Type LSM 5 Pascal with Argon 488 nm Laser and 20× objective. The depth (Z-level) was calculated by LSCM software.

The 2 dimensional image also shows the distance between the ridges in microstructure.

LSCM Manual:

The following parameters are calculated:

Z: height level (selectable with the Z-Threshold and Fill Level sliders) The setting of this value influences the following parameters.

$V_m(Z)$: material volume above chosen height level $V_v(Z)$: void volume below chosen height level $S_{mr}(Z)$: material volume ratio $$S_{mr}(Z) = \frac{V_m(Z)}{V_m(Z_{min})}$$

$S_{vr}(Z)$: void volume ratio $$S_{vr}(Z) = \frac{V_y(Z)}{V_y(Z_{max})}$$

$A_u$: surface bearing area of the topography at Z (=projection area of those parts which are situated above chosen height level)

$S_{mr}$: surface bearing area ratio of the topography at Z percentage of contact area (=$A_u/(x*y)*100\%$)

$S_{dr}$: developed surface area ratio:

Σ(surface area)−Σ(projected area)/Σ(projected area)
*100% projected area=$x*y$

The percentage of the 3-Dimensional surface area (sum of all triangles formed by adjacent data points) to the 2-Dimensional surface area produced by projecting the 3-Dimensional surface onto the threshold plane.

100% flat surface ⇒is equal to base plane

The relative part by which the 3-Dimensional surface is larger than the basic plane (e.g., 625% is a 3-Dimensional surface which is about 6.25 times larger than the projected basic plane)

Tear Strength of the Release Liner Before and After Embossing

Tear strength of the paper release liner was measured according to DIN EN ISO 1924 resp. DIN 53112 in both the down web (machine direction or MD) and the cross-web direction (CD). Sample size was 100 mm by 15 mm. (n=10; t=20+/−5 sec.) Results were recorded in N.

Elmendorf tear experiments were conducted according to DIN 53128 (Frank Tester P 400 m P11:73) on a comparative base. Five samples CD and five samples MD were taken from the original and from the micro-embossed liner. Alternating single specimen of micro-embossed and non-embossed liner were tested and the readings for each kind of liner were averaged.

Final Construction Appearance

The adhesive-coated sheet (still in contact with the micro-embossed release liner) was examined visually to see it the pattern in the liner and adhesive could be readily observed from the plasticized PVC side of the construction.

If the structure could not be readily detected under ambient viewing conditions, the sample was given a rating of GOOD. If the pattern could be readily seen, the sample was given a rating of POOR.

Liner Release Force

The adhesive-coated was removed from the release liner and fixed on an aluminum panel. The specimen width was 25.4 mm. Measurement was performed at 150 mm length. Peel was at 180° at a rate of 300 mm/min. The results were recorded with 15% pre runtime and 5% end-time and recorded as average in N. Each test was repeated 6 times and the results were averaged.

180° Peel Adhesion

Peel adhesion measurements were conducted on aluminum panels (cleaned with MEK and IPA) according to DIN 28510 Teil 2 180° Peel test method. The samples measured 25.4 mm wide and approximately 150 mm long were applied with an automatic 2 kg roller at a speed of 300 mm/min. The material was conditioned for 24 hours at Standard Lab Conditions. The peel test was conducted at a length of 100 mm and at a speed of 300 mm/min. Each test was repeated 5 times and the results were averaged.

Air Bleedability

Samples were conditioned at Standard Lab Conditions for at least 24 hours prior to testing. The test apparatus is an aluminum plate having two separated, circular concentric grooves. One groove is connected with a 15 psi air supply, a pressure valve and pressure gauge, the other with an air outlet and a gas flow meter. A quadratic test sample 15 cm by 15 cm is applied centric above the grooves, covering them completely. Therefore the release liner has to be removed carefully from the film in a 180 Peel back motion so as not to stretch the film or adhesive or micro channels The test sample is adhered to the surface with an automatic roller, equipped with a 1355 g rubber roll at a speed of 300 mm/min, with one forth and back stroke. 90 seconds after first contact between the adhesive and the plate, air with a pressure of 75 inches of water is blown into one groove. The airflow underneath the applied sheet from one groove into the other is measured with the flow scale inline with the second groove and air outlet. The air flow units are recorded 60 second later to allow a stabilized air flow. A correlation table can be used to find the corresponding air flow in terms of ml/min.

Example 1

Preparation of the Micro-Embossed Paper Release Liner

An metal embossing plate was cut with a diamond tool and formed by means of a standard electrogalvanic procedure to provide a three dimensional pyramidal pattern having a pitch of about 300 μm between the structural elements (i.e. from pyramid tip to pyramid tip with 87 lines per inch) a height of 25 μm and an angle of 10° between the top of the pyramid and the base of the pyramid.

An industrial release paper for PSA release having an area weight of 137+/−8 g/m² and a thickness of 153 μm+/−10 μm, commercially available as Rubesil ZU 135/368 from 4P Rube Huhtamaki, Goettingen, Germany, was used as a base material for embossing. The paper has low curling properties, a medium smooth backside, a machine direction tensile strength greater than 8 kN/m (cross direction greater than 3.5 kN/m) and an Elmendorf tear strength of CD greater than 900 mN (CD greater than 700 mN). The paper is 100% bleached and is clay coated on both sides. The paper is coated on one side with a silicone release layer for adhesives. The silicone release material was addition-type low release silicone release material (# 368), provided as a solvent-free coating.

A sheet of release paper measuring 30 cm by 30 cm was placed on top of two sheets of paperboard measuring 15 cm by 15 cm. The stack was placed between a metal plate and the embossed plate of a hydraulic press with the siliconized side upturned toward the pattern of the embossed plate. The hydraulic press was from Schwabenthan Maschinenfabrik Berlin. "Laborpresse Polystat 300S, Auftrag 6299, 1988", 3M Instrument 91259. The punch was switched on with presetting of maximum press force (approximately 430 bar) to press the embossing pattern into the liner. The pressure was held at maximum (reading 330) for 60 seconds at room temperature. Afterwards the pressure was released and the liner material was taken out. On the siliconized side of the liner a structure of the size 15 cm by 15 cm was clearly visible in the surface area of the liner were the stack of paperboard was placed underneath.

The actual pressure utilized can be calculated from the hydraulic pressure. The stamp cylinder of the press has a diameter of 120 mm. 330 bar on a 120 mm cylinder results in 373221 N (337 kN). This force was applied to appr. 150 mm by 150 mm samples, thus an absolute pressure of 16.59 N/mm² (1659 N/cm²) was calculated.

The pattern characteristics of the micro-embossed release liner were measured by laser scanning confocal microscopy as described under Test Methods above. Characteristics of the micro-embossed release liner are summarized in Table 1.

The micro-embossed liner was also tested to determine whether the embossing tool had punched through or interrupted the continuous silicone coating according to the method described under Test Methods above. The results showed that the silicone layer was still intact after embossing.

Coating of the Release Liner With Adhesive

A solvent borne acrylic-based pressure-sensitive adhesive with 40% solids was crosslinked with 3.15% of an bisamide crosslinker The adhesive comprising to 90 percent by weight 2-methylbutyl acrylate and 10 percent by weight acrylic acid was coated onto the siliconized side of the micro-embossed liner using a knife coater at a wet thickness of +/−130 μm and dried first at 23° C. for 60 seconds, followed by 30 seconds at 70° C. in a forced ventilation air oven, and then by about 60 seconds at 105° C. The dry adhesive had a coating weight of 33 g/m².

Preparation of the Finished Construction

A primed flexible plasticized polyvinyl chloride (PVC) film having a thickness of 50 mμ bearing an acrylate-based primer was laminated onto the release liner bearing the micro-structured PSA by contacting the PSA surface with the primer side of the plasticized PVC film and pressing them together with a hand roller at 23° C. The finished construction was conditioned at ambient temperature approximately (23° C.) and 50% relative humidity for 24 hours before testing.

The PVC film surface of the finished construction was examined visually to determine whether the structure in the underlying adhesive and liner could be readily seen under ambient viewing conditions.

Testing of the Adhesive-Coated Sheet

The micro-embossed release liner was removed from the adhesive surface thus exposing the micro-structured adhesive layer. The removal force was measured by the procedure given under Test Methods above.

The remaining adhesive-coated PVC film was then tested for 180° Peel adhesion and was also subjected to an air bleedability test as described above under Test Methods to determined whether the microstructure imparted to the adhesive surface was such that air egress from the bonding interface was present.

Examples 2-3

Example 1 was repeated except that the depth of the microstructure in the release liner was altered by increasing the pressure on the embossing tool from 200 bar to 250 and 330 bar, respectively.

The liner of Example 3 was tested with results as follows: The Elmendorf tear strength in the cross direction was compared to the cross direction tear strength of an unembossed paper. Both papers had tear strengths of about 60 Elmendorf units. The tear strength of Example 3 had MD/CD tear strengths (in kN/m) of 9.6/5.3; the unembossed paper had respective tear values of 9.8/5.2. Example 3 had a liner release force of 0.9 N/2.54 cm and a 180° Peel adhesion of 24.05 N/2.54 cm.

TABLE 1

| Ex | Embossing Pressure Bar | Calc. Force N/cm² | Embossing Time seconds | Pitch μm | Depth μm | Air bleedability | Appearance (with liner) |
|---|---|---|---|---|---|---|---|
| 1 | 200 | 1006 | 60 | 297 | 6.6 | 10 | Good |
| 2 | 250 | 1257 | 60 | 297 | 8.2 | 22 | Good |
| 3 | 330 | 1659 | 60 | 297 | 12.3 | 38 | Good |

Example 4

A microstructured liner was prepared as in Example 1 except that the embossing plate was cut to provide a square pyramidal pattern with a pitch of 200 micrometers, a depth of 13 micrometers, and a distance between the tops of the pyramids of 20 micrometers.

From the above disclosure of the general principles of the present invention and the preceding detailed description, those skilled in this art will readily comprehend the various modifications, re-arrangements and substitutions to which the present invention is susceptible. Therefore, the scope of the invention should be limited only by the following claims and equivalents thereof.

What is claimed is:

1. A structured paper release liner for use with an article backed with a pressure sensitive adhesive, said liner comprising:
    a piece of paper comprising fibers and having a release side free of a structural support layer, a back side, and a structured release surface having a pattern formed into, so as to deform the fibers of, said paper on said release side; and
    a release material bonded so as to contact, and follow the pattern formed into, said structured release surface of said paper,
    wherein said release material does not form a structural support layer, and
    wherein the pattern formed in said paper is dimensioned so as to form fluid egress channels in a bonding surface of the pressure sensitive adhesive, when the pressure sensitive adhesive is applied to said structured release surface or said structured release surface is forced into the bonding surface of the pressure sensitive adhesive, such that the fluid egress channels define a structured bonding surface having exit pathways for at least some of the fluid to bleed out from behind the article when the article is adhered to a substrate.

2. The release liner according to claim 1, wherein said pattern comprises a plurality of outwardly extending protrusions that are sized and shaped so as to penetrate and form fluid egress channels in the pressure sensitive adhesive that is applied onto said structured release surface.

3. The release liner according to claim 1, wherein the pattern formed in said paper on said release side is a contiguous square pyramidal pattern with a shallow angle α of up to about 45 degrees.

4. The release liner according to claim 1, wherein said paper further comprises a support material on said back side of said paper.

5. The release liner according to claim 1, wherein said back side of said paper is relatively flat.

6. The release liner according to claim 1, wherein said structured release surface is a microstructured release surface.

7. The release liner according to claim 1 in combination with an article backed with a pressure sensitive adhesive so as to form an adhesive-backed article assembly, wherein fluid egress channels are formed in a bonding surface of the pressure sensitive adhesive, by the pattern formed in said paper, that define exit pathways for fluid to bleed out from behind said article when said structured bonding surface is disposed on a substrate.

8. The assembly according to claim 7, wherein said fluid egress channels define a volume of at least $1\times10^3$ μm³ per every 500 μm diameter circular area of the structured bonding surface of said adhesive.

9. The assembly according to claim 8, wherein said article is a compliant film having an upper surface, and said fluid egress channels are configured by the pattern of said paper so as to be substantially undetectable on the upper surface of said film, after final application of said film onto a substrate.

10. The assembly according to claim 9, wherein said compliant film has a thickness in a range from about 25 μm to about 100 μm.

11. A method of making an assembly, said method comprising:
    providing a structured paper release liner according to claim 1;
    providing a pressure sensitive adhesive;
    bringing together the pressure sensitive adhesive and the structured release surface of the paper release liner so as to form fluid egress channels in a bonding surface of the pressure sensitive adhesive;
    wherein the fluid egress channels at least partially define a structured bonding surface of the adhesive having exit pathways for fluid to bleed out from behind the back of an article to which the adhesive is bonded, when the adhesive is used to bond the article onto a substrate.

12. The method according to claim 11, further comprising curing the pressure sensitive adhesive after said bringing together.

13. The method according to claim 11, wherein the pressure sensitive adhesive is a hot melt type PSA and during said method, the paper is heated to a temperature that would cause the release liner to become difficult to use in said method, if the pattern was formed in a structural support layer of thermoplastic resin material on the release side.

14. The method according to claim 11, wherein during said method, the paper is heated to a temperature that would cause the release liner to become difficult to use in said method, if the pattern was formed in a structural support layer of thermoplastic resin material on the release side.

15. The method according to claim 11, further comprising:
    bonding together the pressure sensitive adhesive and the back of an article to form an adhesive-backed article.

16. The method according to claim 15, further comprising:
forming the adhesive-backed article assembly by either performing said bonding together and then said bringing together or performing said bringing together and then said bonding together,
wherein the fluid egress channels at least partially define a structured bonding surface of the adhesive having exit pathways for fluid to bleed out from behind the article, when the structured bonding surface is disposed on a substrate.

17. The method according to claim 11, further comprising:
bonding together the pressure sensitive adhesive and the back of an article to form an adhesive-backed article;
forming the adhesive-backed article assembly by either performing said bonding together and then said bringing together or performing said bringing together and then said bonding together; and
curing the pressure sensitive adhesive after said forming of the adhesive-backed article assembly.

18. A method of making a structured paper release liner, for use with an article backed with a pressure sensitive adhesive, said method comprising:
providing a piece of paper comprising fibers and having a release side free of a structural support layer and a back side;
forming a pattern in the paper on the release side so as to deform the fibers and produce a structured release surface on the release side, the pattern formed in the paper being operatively adapted so as to form fluid egress channels in a bonding surface of the pressure sensitive adhesive, when the pattern and the bonding surface are brought together, such that the fluid egress channels define a structured bonding surface having exit pathways for fluid to bleed out from behind the article when the article is adhered to a substrate; and
providing a release material on the release side of the paper, either before or after forming of the structured release surface,
wherein the release material does not form a structural support layer, and the release material is bonded so as to contact and follow the pattern formed into the structure release surface of the paper.

19. The method according to claim 18, wherein said forming occurs without imparting a substantial portion of the pattern through to the back side of the paper.

20. The method according to claim 18, wherein the release liner further comprises a support material on the back side of the paper.

* * * * *

UNITED STATES PATENT AND TRADEMARK OFFICE
CERTIFICATE OF CORRECTION

PATENT NO. : 7,972,670 B2
APPLICATION NO. : 10/595835
DATED : July 5, 2011
INVENTOR(S) : Seitz et al.

It is certified that error appears in the above-identified patent and that said Letters Patent is hereby corrected as shown below:

Column 5, line 13, delete "toy" and insert -- to --.

Column 9, line 7, delete "100#M" and insert -- 100#MF --.

Column 13, line 7, delete "fiat" and insert -- flat --.

Column 14, lines 21-24, delete "$S_{vr}(Z) = \dfrac{V_y(Z)}{V_y(Z_{max})}$" and insert -- $S_{vr}(Z) = \dfrac{V_y(Z)}{V_v(Z_{max})}$ --.

Signed and Sealed this
Thirtieth Day of August, 2011

David J. Kappos
*Director of the United States Patent and Trademark Office*